United States Patent
Ge et al.

(10) Patent No.: US 9,695,571 B1
(45) Date of Patent: Jul. 4, 2017

(54) PAYLOAD MONITORING SYSTEM

(71) Applicant: Caterpillar Inc., Peoria, IL (US)

(72) Inventors: Xinyu Ge, Peoria, IL (US); Tao Yu, Peoria, IL (US)

(73) Assignee: Caterpillar Inc., Peoria, IL (US)

(*) Notice: Subject to any disclaimer, the term of this patent is extended or adjusted under 35 U.S.C. 154(b) by 5 days.

(21) Appl. No.: 14/964,918

(22) Filed: Dec. 10, 2015

(51) Int. Cl.
*E02F 3/43* (2006.01)
*E02F 9/26* (2006.01)

(52) U.S. Cl.
CPC .............. *E02F 3/431* (2013.01); *E02F 9/265* (2013.01)

(58) Field of Classification Search
CPC .................................. E02F 3/431; E02F 9/265
USPC ........................................................ 701/50, 2
See application file for complete search history.

(56) References Cited

U.S. PATENT DOCUMENTS

| | | | |
|---|---|---|---|
| 4,697,418 A | 10/1987 | Okabe et al. | |
| 5,822,224 A | 10/1998 | Nakanishi et al. | |
| 6,114,993 A | 9/2000 | Henderson et al. | |
| 7,627,410 B2 | 12/2009 | Berry et al. | |
| 7,748,489 B2 * | 7/2010 | Sheidler | A01D 41/12 180/242 |
| 7,934,329 B2 | 5/2011 | Mintah et al. | |
| 8,311,970 B2 | 11/2012 | Mcaree et al. | |
| 8,340,872 B2 * | 12/2012 | Mintah | E02F 9/264 701/1 |
| 8,386,134 B2 | 2/2013 | Morey et al. | |
| 8,527,158 B2 | 9/2013 | Faivre et al. | |
| 8,538,645 B2 | 9/2013 | Anderson et al. | |
| 8,606,451 B2 | 12/2013 | Abdel-Baqi et al. | |
| 8,833,861 B2 | 9/2014 | Donnelli et al. | |
| 8,924,094 B2 | 12/2014 | Faivre et al. | |
| 8,954,243 B2 | 2/2015 | Harshberger et al. | |
| 2006/0211535 A1 * | 9/2006 | Casey | B60K 17/356 477/3 |
| 2007/0124050 A1 | 5/2007 | Donnelli et al. | |
| 2012/0290178 A1 | 11/2012 | Suzuki et al. | |
| 2012/0330550 A1 | 12/2012 | Jensen | |
| 2014/0107895 A1 | 4/2014 | Faivre et al. | |

FOREIGN PATENT DOCUMENTS

| | | |
|---|---|---|
| JP | 2008303648 | 12/2008 |
| WO | 2015156018 | 10/2015 |

* cited by examiner

*Primary Examiner* — Tan Q Nguyen
(74) *Attorney, Agent, or Firm* — Pooja Van Dyck

(57) ABSTRACT

A payload monitoring system on a machine includes a payload sensor configured to generate a plurality of payload data corresponding to a payload amount in a bucket of a machine, the plurality including a first payload data and a second payload data and a controller. The controller is configured to receive the first payload data from the payload sensor and off-board payload data from an off-board system, compare the first payload data to the off-board payload data to generate a payload data offset, receive the second payload data from the payload sensor, and generate an adjusted payload data based on the second payload data and the payload data offset.

20 Claims, 2 Drawing Sheets

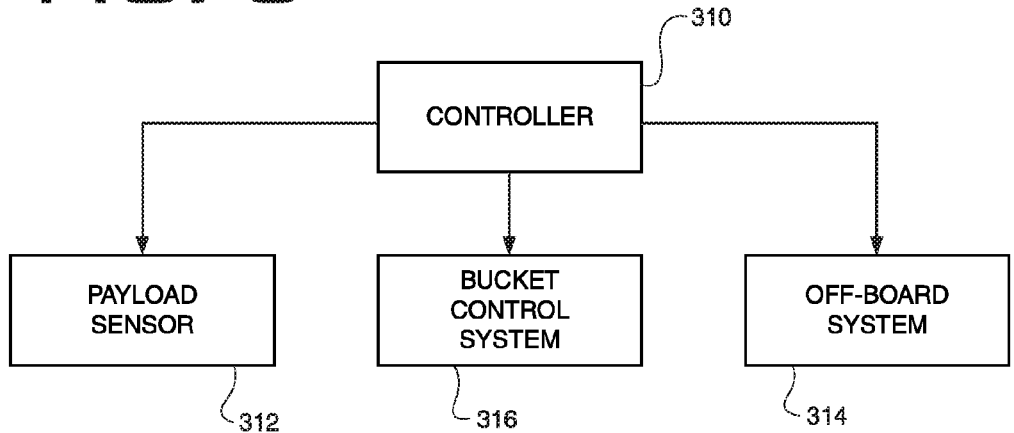
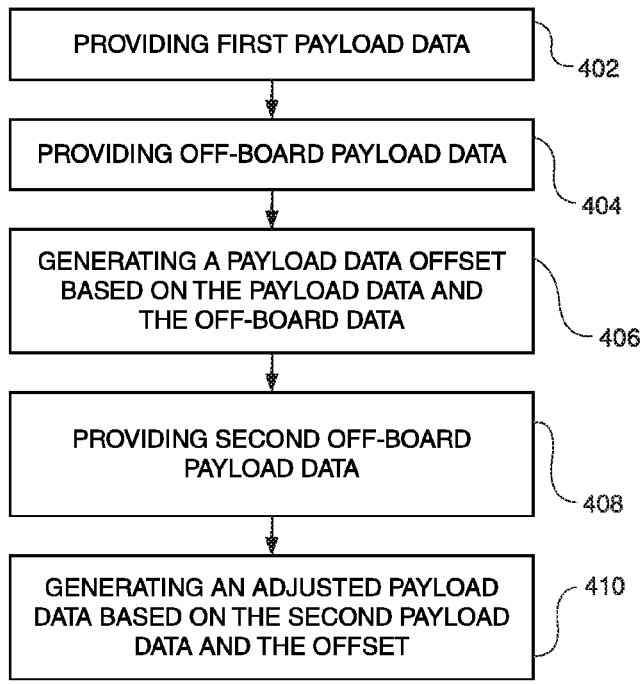

PAYLOAD MONITORING SYSTEM

TECHNICAL FIELD

The disclosure relates generally to payload monitoring systems, and more particularly, to payload monitoring systems on machines that can generate adjusted payload data based on off-board payload data.

BACKGROUND

It may be beneficial to optimize the payload arrangement for a heavy duty machine such as a heavy duty excavator or a front shovel. An excavator is designed to operate in substantially-repetitive work cycles. For example, a front shovel or excavator may typically operate in work cycles that include digging, swinging, dumping, and returning steps for operating a bucket to dig and load fragmented rock, earth, minerals, overburden, and the like, for mining purposes. To improve the operation efficiency, a haul machine, such as a large mining truck, may be loaded to full capacity with a minimum number of work cycles of the front shovel.

One way to determine the total weight of the material loaded onto a mining truck is to automatically calculate or estimate the total payload delivered to the mining truck by the work tool of an excavator. Monitoring the total weight of each payload can ensure that the mining truck's capacity is fully used.

The above concerns have prompted designers to propose various means for more accurately measuring the payload amount in the bucket. One such method is known from U.S. Pat. No. 8,924,094 to Faivre et al. The '094 patent discloses a method of determining a payload including sensing a position of a tool, sensing a boom velocity, and sensing a boom swinging velocity. Thus, the '094 patent discloses determining the payload based on a movement of the bucket and boom. These types of determinations based on movement can include errors because the determinations depend on the operator of the excavator to move the bucket in a particular manner.

SUMMARY OF THE INVENTION

The disclosure relates to a payload monitoring system on a machine and a method of controlling a payload system on a machine. The payload monitoring system can include payload sensor configured to generate a plurality of payload data corresponding to a payload amount in a bucket of a machine, the plurality of payload data comprising a first payload data and a second payload data. The payload monitoring system can also include a controller configured to receive the first payload data from the payload sensor and off-board payload data from an off-board system, compare the first payload data to the off-board payload data to generate a payload data offset, receive the second payload data from the payload sensor, and generate an adjusted payload data based on the second payload data and the payload data offset.

In another embodiment, the payload monitoring system can include a first machine including a bucket, a payload controller, and a payload sensor. The payload controller can be configured to receive the first payload data from the payload sensor and off-board payload data from an off-board system, compare the first payload data to the off-board payload data to generate a payload data offset, receive the second payload data from the payload sensor, and generate an adjusted payload data based on the second payload data and the payload data offset. The payload sensor can be configured to generate a plurality of payload data corresponding to a payload amount in the bucket, wherein the plurality of payload data includes a first payload data and a second payload data. The payload monitoring system can further include an off-board machine including a receiving area and an off-board payload sensor configured to generate off-board payload data.

In yet another embodiment, a method of controlling a payload system on a first machine can include providing first payload data from a payload sensor on a first machine having a bucket; providing off-board payload data from an off-board payload sensor on a second machine having a receiving body; generating a payload data offset by comparing the first payload data to the off-board payload data; providing second payload data from the payload sensor; and generating an adjusted payload data based on a second payload data and the payload data offset.

BRIEF DESCRIPTION OF THE DRAWINGS

FIG. 3 is a diagram of the controller;
and
FIG. 4 is a flowchart of the disclosed method.

DETAILED DESCRIPTION

Figure 1:
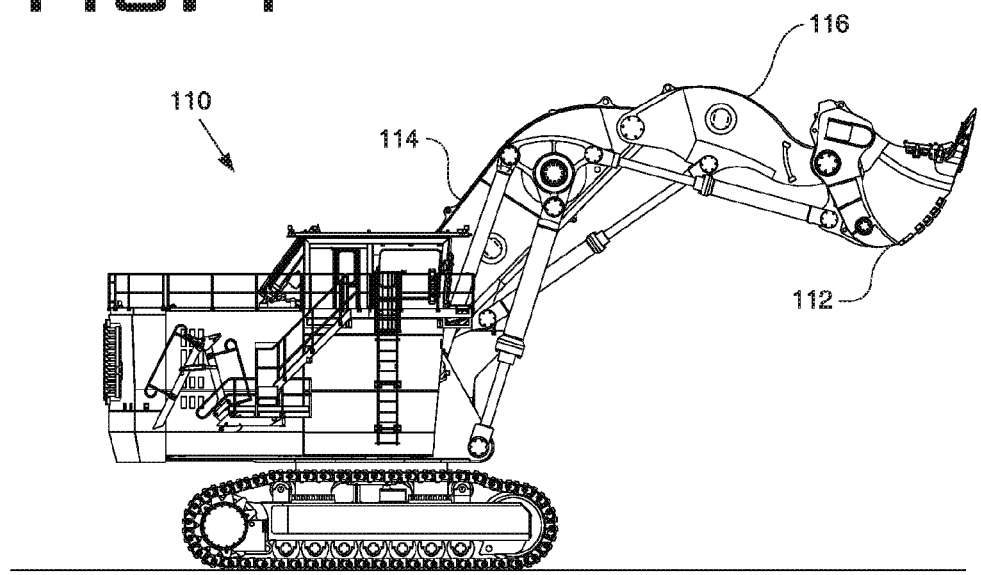
FIG. 1 is an illustration of an excavator.

In an embodiment shown in FIG. 1, an excavator 110 is illustrated with a bucket 112. In this figure, the excavator 110 is a front shovel excavator. Although FIG. 1 shows the excavator 110, the excavator 110 can be any loading machine, such as a digger, mechanical shovel, power shovel, front shovel, or loader. The bucket 112 on the excavator 110 can pick up loads of varying amounts. The excavator 110 can control a boom 114, a stick 116, and the bucket 112 to pick up a payload amount in the bucket 112.

Figure 2:
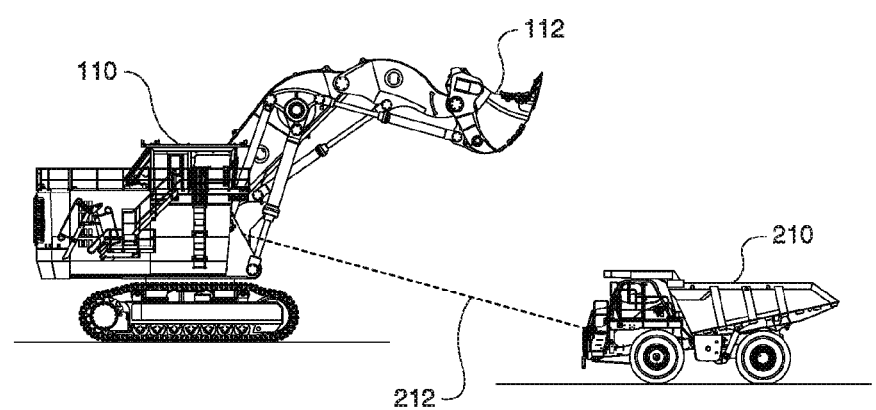
FIG. 2 is a depiction of an excavator and a mining truck communicating data at a mining site.

Referring to FIG. 2, the excavator 110 communicates with a mining truck 210. Although FIG. 2 shows a mining truck, the mining truck 210 can be any receiving machines, such as a dump truck, a hopper, an articulated truck, or other machine capable of receiving the material from the excavator 110. The mining truck 210 can generate payload data, such as off-board payload data 212. Further, the mining truck 210 can send the off-board payload data 212 to the excavator 110. The off-board payload data 212 can be generated by measuring the payload of the mining truck 210. In an embodiment, the off-board payload data 212 can be generated while the mining truck 210 is stationary. This can increase the accuracy of the payload weight measurement. An off-board system 314 on the mining truck 210 can communicate the off-board payload data 212 to the excavator 110.

The excavator 110 picks up a payload and performs a load estimation of the payload to generate a plurality of payload data. Usually, the load estimation is performed while the bucket 112 is moving. The load estimation can be derived on a regression model or physical dynamic model. The regression model and physical dynamic model need to be calibrated during a calibration process by assigning proper values to the related coefficients in both models. Furthermore, the load estimation usually requires the operator to move the bucket 112 in a precise manner so that the load estimation can be compared to the calibrated baseline value and the error of estimation is minimized. Without adjusting the model coefficients further during working operations, load estimation on an excavator 110 can be inaccurate because the operator may not move in the precise manner to replicate the typical work cycles utilized during the calibration process. The off-board payload data 212 provided by the stationary mining truck 210 is generally more accurate because the payload and the payload sensors are stationary.

Referring to FIG. 3, the excavator 110 can include a controller 310. The controller 310 can receive a first payload data from a payload sensor 312 and off-board payload data 212 from an off-board system 314. For example, the payload sensor 312 can include one or more of a virtual sensor, pressure sensor, and a load cell. In one embodiment, the payload sensor 312 can be a pressure sensor associated with one or more cylinders of the bucket 112, boom 114, and stick 116. In another embodiment, the payload sensor 312 can be a load cell placed between the mating mechanical components of the excavator 110 or on a support structure of the boom 114. In another embodiment, the payload sensor 312 can be a virtual sensor that takes into account data from one or more of pressure sensors, load cells, or positions and velocities of the bucket 112, the boom 114, and the stick 116. The virtual sensor can derive the payload data based on load estimation.

The controller 310 can compare the first payload data from the payload sensor 312 to the off-board payload data 212 from the off-board system 314 to generate a payload data offset. In one embodiment, the controller 310 can adjust the coefficients of either the regression model or the physical dynamic model by comparing the first payload data from payload sensor 312 to the off-board payload data 212 using the offset. In one embodiment, the off-board payload data is measured by the off-board system 314 on the mining truck 210 when the mining truck 210 is in a stationary state.

The controller 310 can then receive a second payload data from the payload sensor 312. In one embodiment the controller 310 can generate an adjusted payload data based on the second payload data and the payload data offset. In another embodiment, the controller 310 can generate an adjusted payload data by adjusting the coefficients of the load estimation. The controller 310 can also determine a remaining capacity of the mining truck 210 based on the off-board payload data 212.

The controller 310 can send the adjusted payload data to the bucket control system 316. The bucket control system 316 can control one or more of the boom 114, the stick 116, and the bucket 112 to increase or decrease the payload amount in the bucket. Improving the accuracy of the payload data improves efficiency of the excavator, which can also reduce fuel consumption. As a result, the efficiency of mine site also increases.

This payload data offset can be used to improve the accuracy of the payload data. The excavator 110 can pick up a first payload and generate a first payload data based on the payload sensor 312. The excavator 110 can then deposit the first payload in the mining truck 210. The mining truck 210 includes payload sensors of its own, for example, off-board payload sensors in an off-board system 314. The mining truck 210 can determine the off-board payload weight, or off-board payload data 212, using the off-board sensors and communicate the off-board payload data 212 to controller 310 on the excavator 110.

The controller 310 on the excavator 110 can compare the first payload data and the off-board payload data 212 and generate a payload data offset based on the difference between the two amounts. The excavator 110 can pick up a second payload and generate a second payload data based on the payload sensor 312. The controller 310 can generate an adjusted payload data based on the second payload data and the payload data offset. The controller 310 can generate the adjusted payload data one or more times to improve the accuracy of the payload data.

In another embodiment, the controller 310 on the excavator 110 can adaptively adjust the coefficients of either the regression model or physical dynamic model by recalibrating the regression model or physical dynamic model with the off-board payload data 212. Because the off-board payload data 212 is typically measured when the mining truck 210 is in a stationary state, the off-board payload data 212 provides an accurate reference value. The excavator 110 can pick up a second payload and generate an adjusted payload data based on the offset or the recalibrated regression model or physical dynamic model.

Excavators 110 can increase or decrease the payload amount in the bucket 112 using the bucket control system 316 based on the adjusted payload data. For example, an excavator 110 can decrease the digging capacity of its bucket 112 by turning the bucket 112 towards the stick 116 earlier than at pre-defined full load point. The excavator 110 can then deposit a payload amount to maximize use of the remaining capacity of the mining truck 210.

For example, if an excavator 110 needs to load 80 tons of payload material into a mining truck 210, and the excavator 110 picks up 40 tons of payload material according to the payload sensor 312 corresponding to the amount in the bucket 112 on the excavator 110. The excavator 110 deposits its payload in the mining truck 210. The off-board sensors on the mining truck 210 determine that 35 tons of payload material was deposited from the excavator 110. The off-board system 314 can send data corresponding to the payload amount of 35 tons to the controller 310 on the excavator 110. The controller 310 can compare the first payload data, 40 tons, to the off-board payload data 212, 35 tons, and generate a payload data offset, 5 tons.

The controller 310 can use the off-board payload data 212 to determine that the mining truck 210 still has a remaining capacity of 45 tons. Further, the controller 310 can receive a second payload data when the excavator 110 picks up a second load, for example, 50 tons. In one embodiment, the controller can generate an adjusted payload data of 45 tons based on the second payload data and the payload data offset. In another embodiment, the controller 310 can generate an adjusted payload data of 45 tons according to the adjusted estimation model which is adaptively modified by the controller 310 as well, after the controller 310 determines that there is 5 ton difference between the first payload data (40 tons) and the off-board payload data 212 (35 tons). Without the adjusted payload data, an operator would assume that the payload amount in the bucket 112 of the excavator 110 would be 5 tons overs the remaining capacity of the mining truck 210. The operator would then have to hold back 5 tons when depositing the payload material in the mining truck 210 or pick up another load that corresponds to the remaining capacity of the mining truck 210 or less. However, because of the adjusted payload data, the operator can deposit the entire payload amount in the bucket 112 of the excavator 110 into the mining truck 210.

Alternatively, the controller 310 can send the adjusted payload data to the bucket control system 316. The bucket control system 316 can control one or more of the bucket 112, the stick 116, and the boom 114 to pick up payload to maximize efficiency of the excavator 110 and use of the remaining capacity in the mining truck 210. When the controller 310 can improve the accuracy of the payload data from the load estimation, performance and efficiency improve and fuel consumption is reduced.

INDUSTRIAL APPLICABILITY

As described, the controller 310 can receive payload data from payload sensor 312 and the off-board system 314. The controller 310 can compare the payload data from the estimation model and the off-board system 314 to either generate a payload data offset or adjust the load estimation using one or more of the offset, the payload data, and the off-board payload data. The controller 310 can then generate an adjusted payload data by applying the offset to the second payload data or by adjusting the coefficients of the load estimation to minimize the error. The controller 310 can send the adjusted payload data to the bucket control system 316. The adjusted payload data enables the excavator 110 to increase efficiency of the excavator 110 and maximize use of the remaining capacity of the mining truck 210.

In an embodiment, FIG. 4 discloses a method of controlling a payload system on a machine. At block 402, the method includes providing first payload data. At block 404, the method includes providing off-board payload data 212. The method then includes generating a payload data offset based on the first payload data and the off-board payload data 212, at block 406. Alternatively, the method can include adjusting the load estimation to minimize the difference between the first payload data and the off-board payload data 212.

At block 408, the method includes providing second payload data. The method includes generating an adjusted payload data based on the second payload data and the payload data offset, at block 410. In one embodiment, the controller 310 can apply the offset to the second payload data. In another embodiment, the controller 310 can adjust the coefficients of the load estimation to provide an adjusted payload data. The adjusted payload data can be used in many ways. In one embodiment, the adjusted payload data can be sent to the bucket control system 316, which can regulate the amount of payload material in the bucket 112 by controlling one or more of the boom 114, stick 116, and bucket 112.

Other aspects, features, and advantages will be apparent upon an examination of the attached Figures and appended claims.

The present description is for illustrative purposed only, and should not be construed to narrow the breadth of the present disclosure in any fashion. Thus, those skilled in the art will appreciate that various modifications might be made to the presently disclosed embodiments without departing from the intended spirit and scope of the present disclosure.

What is claimed is:

1. A payload monitoring system on a machine comprising:
a payload sensor configured to generate a plurality of payload data corresponding to a payload amount in a bucket of a machine, the plurality of payload data comprising a first payload data and a second payload data; and
a controller configured to:
receive the first payload data from the payload sensor and off-board payload data from an off-board system,
compare the first payload data to the off-board payload data to generate a payload data offset,
receive the second payload data from the payload sensor, and
generate an adjusted payload data based on the second payload data and the payload data offset.

2. The payload monitoring system of claim 1, wherein the plurality of payload data is based on a movement of the bucket.

3. The payload monitoring system of claim 1, wherein the machine is an excavator.

4. The payload monitoring system of claim 1, wherein the controller is configured to communicate the adjusted payload data to a bucket control system.

5. The payload monitoring system of claim 4, wherein the bucket control system is configured to regulate the payload amount based on the adjusted payload data.

6. The payload monitoring system of claim 1, wherein the off-board system is configured to communicate the off-board payload data to the controller.

7. A payload monitoring system comprising:
a first machine comprising:
a bucket,
a payload sensor configured to generate a plurality of payload data corresponding to a payload amount in the bucket, the plurality of payload data comprising a first payload data and a second payload data; and
a controller configured to:
receive the first payload data from the payload sensor and off-board payload data from an off-board system,
compare the first payload data to the off-board payload data to generate a payload data offset,
receive the second payload data from the payload sensor, and
generate an adjusted payload data based on the second payload data and the payload data offset; and
an off-board machine comprising:
a receiving area and
an off-board payload sensor configured to generate off-board payload data.

8. The payload monitoring system of claim 7, wherein the first machine is an excavator.

9. The payload monitoring system of claim 7, wherein the controller calculates a weight of a payload based on a movement of the bucket from payload data from the payload sensor.

10. The payload monitoring system of claim 7, wherein the off-board machine is a mining truck.

11. The payload monitoring system of claim 7, wherein the controller is configured to send the adjusted payload data to a bucket control system.

12. The payload monitoring system of claim 11, wherein the bucket control system can adjust the payload amount in the bucket of the first machine based on the adjusted payload data.

13. The payload monitoring system of claim 12, wherein the bucket control system controls one or more of a boom, a stick, and the bucket.

14. A method of controlling a payload system on a first machine, the method comprising:
providing first payload data from a payload sensor on a first machine having a bucket;
providing off-board payload data from an off-board payload sensor on a second machine having a receiving body;
generating a payload data offset by comparing the first payload data to the off-board payload data;
providing second payload data from the payload sensor; and
generating an adjusted payload data based on the second payload data and the payload data offset.

15. The method of claim 14, wherein the first machine comprises an excavator.

16. The method of claim 14, wherein the second machine comprises a mining truck.

17. The method of claim 14, wherein the first payload data and the second payload data are generated based on a movement of the bucket.

18. The method of claim 14, further comprising adjusting a payload amount in the bucket based on the adjusted payload data.

19. The method of claim 14, further comprising generating a remaining capacity on the second machine based on the off-board payload data.

20. The method of claim 19, further comprising communicating the remaining capacity data to the first machine.

* * * * *